United States Patent
Liu et al.

(10) Patent No.: US 8,786,983 B1
(45) Date of Patent: Jul. 22, 2014

(54) MAGNETIC WRITER HAVING A LOW ASPECT RATIO TWO LAYER COIL

(75) Inventors: Feng Liu, San Ramon, CA (US); Zhanjie Li, Pleasanton, CA (US); Zhigang Bai, Milpitas, CA (US); Ut Tran, San Jose, CA (US); Kevin K. Lin, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 23 days.

(21) Appl. No.: 13/532,658

(22) Filed: Jun. 25, 2012

(51) Int. Cl.
G11B 5/17 (2006.01)

(52) U.S. Cl.
USPC ...................................... 360/123.02

(58) Field of Classification Search
USPC ............. 360/123.02, 123.03, 123.05, 123.06, 360/123.11, 123.15, 123.17, 125.02
See application file for complete search history.

(56) References Cited

U.S. PATENT DOCUMENTS

| | | | |
|---|---|---|---|
| 4,639,811 A * | 1/1987 | Diepers et al. | 360/125.15 |
| 4,652,956 A * | 3/1987 | Schewe | 360/123.11 |
| 4,694,368 A | 9/1987 | Bischoff et al. | |
| 4,703,382 A * | 10/1987 | Schewe et al. | 360/123.11 |
| 5,173,826 A | 12/1992 | Bischoff | |
| 5,472,736 A | 12/1995 | Barr et al. | |
| 5,875,080 A * | 2/1999 | Seagle | 360/123.39 |
| 6,246,541 B1 | 6/2001 | Furuichi et al. | |
| 6,333,830 B2 * | 12/2001 | Rose et al. | 360/123.41 |
| 6,349,014 B1 | 2/2002 | Crue, Jr. et al. | |
| 6,466,404 B1 | 10/2002 | Crue, Jr. et al. | |
| 6,525,901 B1 | 2/2003 | Kamijima et al. | |
| 6,654,202 B2 | 11/2003 | Rea et al. | |
| 6,861,937 B1 | 3/2005 | Feng et al. | |
| 7,006,327 B2 | 2/2006 | Krounbi et al. | |
| 7,116,517 B1 | 10/2006 | He et al. | |
| 7,126,788 B1 | 10/2006 | Liu et al. | |
| 7,386,933 B1 | 6/2008 | Krounbi et al. | |
| 7,430,098 B1 * | 9/2008 | Song et al. | 360/294.7 |
| 7,573,682 B2 * | 8/2009 | Pust et al. | 360/294.7 |
| 7,974,046 B2 * | 7/2011 | Ota et al. | 360/294.7 |
| 8,035,920 B2 | 10/2011 | Na et al. | |
| 8,035,921 B2 * | 10/2011 | Sunwoo | 360/123.05 |
| 8,218,264 B1 * | 7/2012 | Sasaki et al. | 360/125.16 |
| 8,300,357 B1 * | 10/2012 | Sasaki et al. | 360/123.06 |
| 8,422,166 B1 * | 4/2013 | Sasaki et al. | 360/123.06 |
| 8,514,517 B1 * | 8/2013 | Batra et al. | 360/123.03 |
| 8,547,659 B1 * | 10/2013 | Bai et al. | 360/123.06 |
| 2004/0169958 A1 | 9/2004 | Krounbi et al. | |
| 2005/0024765 A1 | 2/2005 | Han et al. | |
| 2005/0052771 A1 | 3/2005 | Rausch et al. | |
| 2008/0316646 A1 | 12/2008 | Na et al. | |
| 2011/0273797 A1 * | 11/2011 | Biskeborn et al. | 360/123.01 |

* cited by examiner

Primary Examiner — Angel Castro

(57) ABSTRACT

A method and system provide a magnetic transducer having an air-bearing surface (ABS). The magnetic transducer includes a write pole and at least one coil. The write pole has a pole tip and a yoke. The coil(s) energize the write pole. The coil(s) include a plurality of turns a first distance from the pole and at least one additional turn a second distance from the pole. The first distance is different from the second distance. The at least one additional turn extends over at least part of two of the plurality of turns, has a length in a stripe height direction perpendicular to the ABS and has a height in a down track direction. The length is greater than the height.

26 Claims, 6 Drawing Sheets

MAGNETIC WRITER HAVING A LOW ASPECT RATIO TWO LAYER COIL

BACKGROUND

Disk drives typically use heads residing on sliders to read from and write to the magnetic media. A head typically includes a read transducer and a write, or recording transducer. FIG. 1 depicts a conventional magnetic recording transducer 10. The magnetic recording transducer 10 includes coils 12, main pole 14, insulators 16, and shield 18. The conventional write transducer 10 typically utilizes photoresist as the insulator 16. In addition, the return shield 18 is typically formed of two separate pieces—18A and 18B. The coil 12 has three turns. Typically, three turns are required to obtain a sufficient field in the yoke of the pole 14.

The trend in magnetic recording is to higher densities and higher data rates. For higher data rates, additional requirements may be placed on the conventional write transducer 10. For example, a faster field rise time and, therefore, faster magnetic field reversals are desired. Faster times generally require a shorter yoke length. A shorter yoke length also corresponds to a smaller distance available for the coils 12. However, the conventional transducers 10 can only be shrunk to a limited extent because of the coil cross-section required to support the desired current and insulation between the turns. For example, the length of the yoke for the transducers 10 is typically 5 μm or longer. Thus, the write transducers 10 may be unsuitable for use at higher data rates.

Accordingly, what is needed is a system and method for providing improved write transducers that may be used at higher data rates.

BRIEF SUMMARY OF THE INVENTION

A method and system provide a magnetic transducer having an air-bearing surface (ABS). The magnetic transducer includes a write pole and at least one coil. The write pole has a pole tip and a yoke. The coil(s) energize the write pole. The coil(s) include a plurality of turns a first distance from the pole and at least one additional turn a second distance from the pole. The first distance is different from the second distance. The at least one additional turn extends over at least part of two of the plurality of turns, has a length in a stripe height direction perpendicular to the ABS and has a height in a down track direction. The length is greater than the height.

DETAILED DESCRIPTION OF THE PREFERRED EMBODIMENTS

Figure 1:
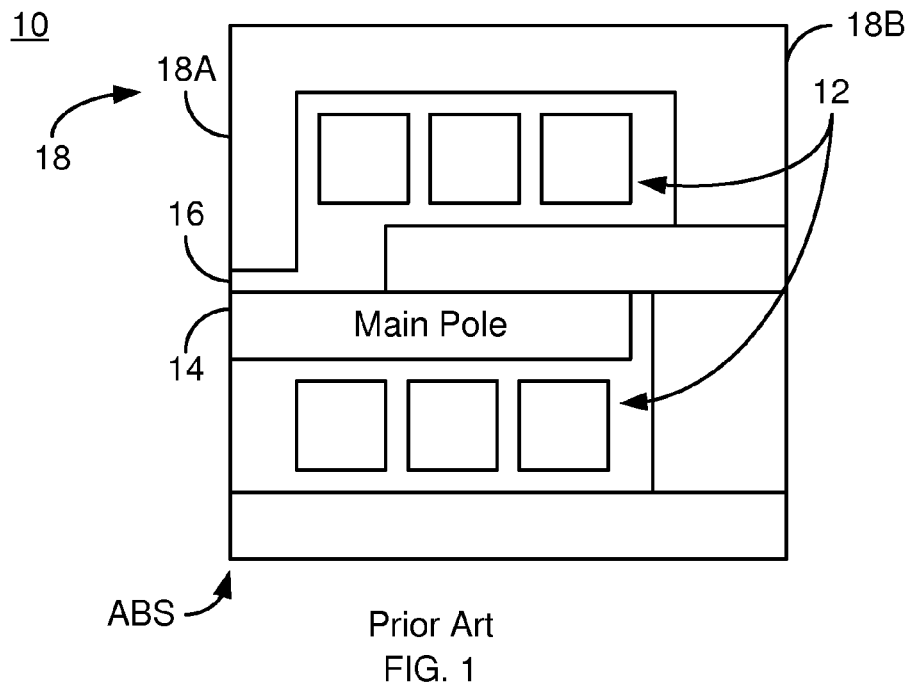
FIG. 1 is a diagram of a side view of a conventional write transducer.
Figure 2:
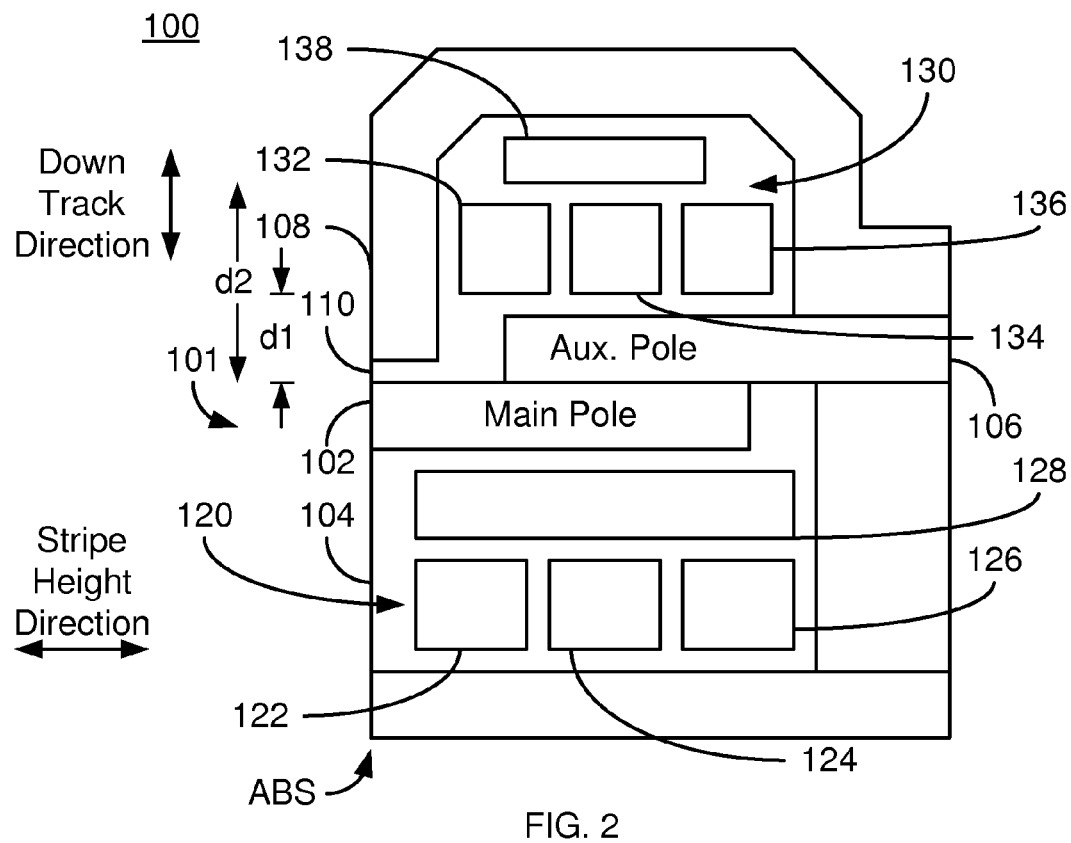
FIG. 2 depicts a side view of an exemplary embodiment of a write transducer.

FIG. 2 depicts a side view of a portion of an exemplary embodiment of a disk drive. More specifically, FIG. 2 depicts a portion of a write transducer 100. The write transducer 100 may be part of a merged head that also includes a read transducer and which resides in a disk drive. For simplicity, components are omitted. In addition, for clarity, FIG. 2 is not drawn to scale.

The magnetic transducer 100 has a write pole 101 as well as coils 120 and 130. The write pole 101 includes main pole 102 and auxiliary pole 106. Also shown are shield 108 and insulators 104 and 110. The pole 101 has a pole tip opposite to the portion of the shield 108 at the ABS and a yoke which lies between the coils 120 and 130. The pole 101 may be a perpendicular magnetic recording (PMR) pole. Thus, the transducer 100 may be a PMR transducer. However, the pole 101 and transducer may be used in other writers. For example, the transducer 100 may be an energy assisted magnetic recording (EAMR) transducer. In such a case, optics (not shown) are typically included. Further, a read transducer may also be coupled with the write transducer 100. The shield 108 is a single piece. However, in other embodiments, the shield 108 may have multiple pieces.

The coils 120 and 130 are conductive and carry a write current used to energize the pole. In some embodiments, the coils 120 and 130 may be separate, pancake coils. In other embodiments, the coils 120 and 130 form a single helical coil. The insulator 104 may include several different insulators and/or may be formed in multiple fabrication steps. The insulator 104 is nonmagnetic and insulates the turns 122, 124, 126 and 128 of the coil 120. Another, analogous insulator 110 may be used to insulate the turns 132, 134, 136 and 138 of the coil 130. The insulators 104/110 may be aluminum oxide. In some embodiments, the aluminum oxide is deposited via atomic layer deposition (ALD), the thickness of the insulator between turns 132, 134 and 136 may be not more than approximately 0.25 μm. In some embodiments, the thickness of the insulator is 0.05 μm-0.25 μm. The distance between the layer including turns 132, 134 and 136 and the layer including turn 138 may be not more than approximately 0.25 μm. In some embodiments, the distance between the layers is 0.05 μm-0.25 μm. However, in other embodiments, the insulators 104/110 may include other materials Including but not limited to photoresist.

The coil 120 includes turns 122, 124, 126 and 128. Similarly, the coil 130 includes turns 132, 134, 136 and 138. Thus, each of the coils 120 and 130 includes four turns. In the embodiment shown, the coil 120 includes two layers of turns. In another embodiment, the coil 120 may include a single layer of turns. The coil 130 includes two sets of turns. The first set includes multiple turns 132, 134, and 136. The second set includes a single turn 138. In another embodiment, the second set may include multiple turns. The first set of turns 132, 134 and 136 is a first distance, d1, from the pole 101 while the second set 138 is a second distance, d2, from the pole 101 that is different from the first distance. Thus, the coil 130 includes two layers of turns.

The turn 138 has a length in the stripe height direction perpendicular to the ABS and a height in a down track direction. The length is greater than the height. Thus, the turn 138 is longer than it is tall. Consequently, the turn 138 may be viewed as having a low aspect ratio. In addition, the turn 138 extends over more than one of the turns 132, 134 and 136 in the other layer. In the embodiment shown, the turn 138 extends over at least a portion of each of the turns 132, 134 and 136. In some embodiments, the turn 138 extends over at least half of the outer turns 132 and 136. In some embodiments, the turn 138 extends to the edge turn 132 closest to the ABS and to the edge of the turn 136 furthest from the ABS. In another embodiment, the turn 138 may extend over some or all of only two turns 132 and 134 or turns 134 and 136. In addition, the turns in different layers of the coil 130 may have different aspect ratios. Thus, in the embodiment shown, the turn 138 has a different aspect ratio from the turns 132, 134 and 136. However, in at least some embodiments, the cross-sectional area of the turn 138 has the substantially the same cross-sectional area as the turns 132, 134 and 136. In such embodiments, each of the turns 132, 134, 136 and 138 may have the same current density. In the embodiment shown, current is carried perpendicular to the page for in the region shown in FIG. 2. Note that the coils 120 and 130 are shown as having square/rectangular cross-sections. However, in other embodiments, the coils 120 and 130 may have another shape. For example, the sides of each turn 122, 124, 126, 128, 132, 134, 136 and/or 138 may not be vertical and/or may be curved. In the embodiment shown, both coils 120 and 130 have turns 128 and 138, respectively, that are wider than they are tall and extend over multiple turns in the other layer. However, in other embodiments, only one of the coils 120 or 130 has such a turn 128 or 138. In such a case, the coil 130 is desired to have such a turn 138 because there may be less space in the region in which the coil 130 resides.

The length of the coil 130 in the stripe height direction may be reduced while the current carrying ability of the coils 120 and 130 may be maintained. The turns 132, 134, 136 and 138 do not extend as far in the stripe height direction as a four turn coil (not shown) having a single layer of coils. For example, in some embodiments, the coil 130 extends not more than 4.5 µm in the stripe height direction. In some such embodiments, the coil 130 extends not more than 3 µm in the stripe height direction. Because the turn 138 has a height that is less than its length, the shield 108 may have a lower profile in the down track direction.

The magnetic transducer 100 may have improved performance at high data rates. Because of the configuration of the turn 128 and 138, the coils 120 and 130 may occupy less space in the stripe height direction. The magnetic transducer 100 may have more turns (e.g. four) than a three-turn coil occupying the same amount of space in the stripe height direction. The yoke length of the transducer 100 may be the same as that of a transducer having only one layer of turns corresponding to the turns 132, 134 and 136. Conversely, the yoke length of the transducer 100 may be shorter than that of a transducer having a single coil layer of four turns. In addition to its shorter yoke length, the transducer 100 may provide more current around the pole 101 because of the turn 138. For example, the transducer 100 may have an extra turn, but have a yoke length that is not greater than the yoke length of the transducer 10. In some embodiments, the length of the yoke of the pole 101 may be not more than 4.5 µm. In some such embodiments, the yoke length of the pole 101 may be not more than 3.0 µm. Thus, a pole 101 may have a yoke length that is not greater than the yoke length of a conventional transducer but provide more current (e.g. twenty-five percent more current) to the pole 101 because of the extra turn. Consequently, a higher field may be obtained from the pole 101. Further, because the yoke length of the transducer 100 may be less than that of a conventional transducer having the same number of turns, the rise time of the transducer 100 may be reduced. Performance of the transducer 100 may thus be improved.

Figure 3:
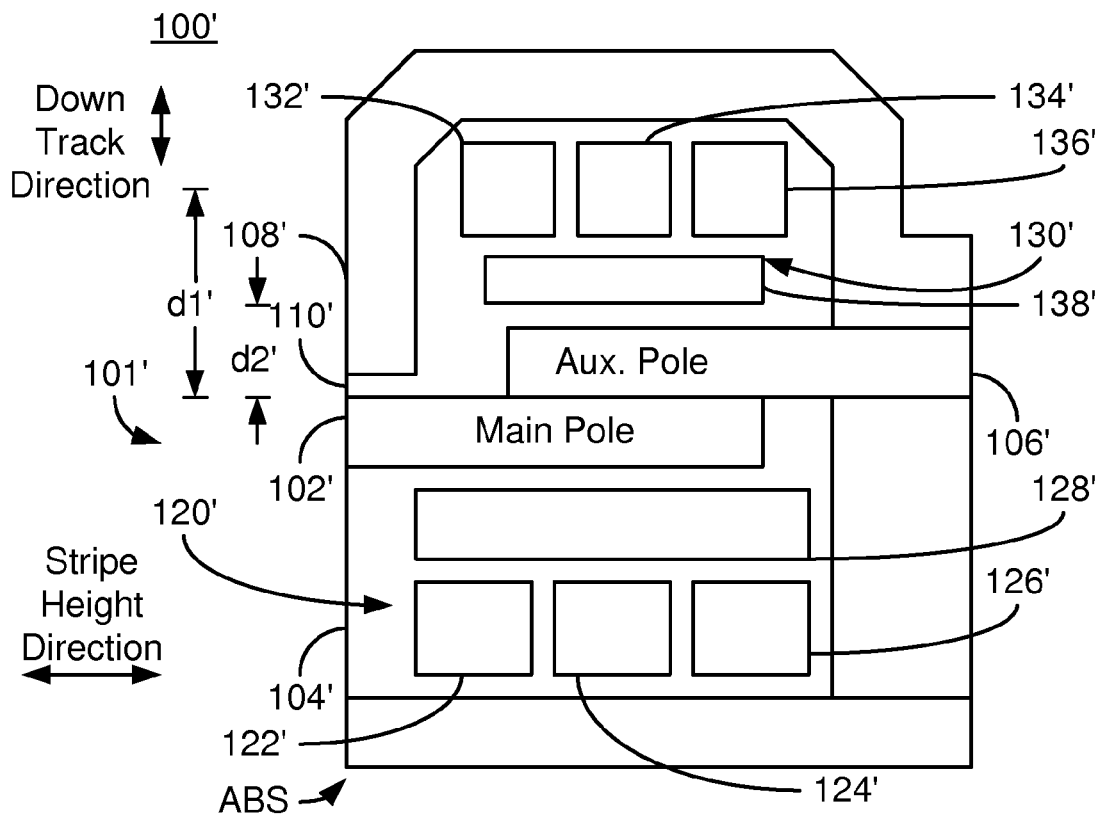
FIG. 3 depicts a side view of another exemplary embodiment of a write transducer.

FIG. 3 depicts a side view of an exemplary embodiment of a magnetic recording transducer 100'. For simplicity, FIG. 3 is not to scale. The magnetic transducer 100' is analogous to the magnetic transducer 100. Consequently, analogous components are labeled similarly. The magnetic write transducer 100' thus includes a write pole 101' having a main pole 102' and auxiliary pole 106', insulators 104' and 110', shield 108' and coils 120' and 130' that are analogous to the write pole 101 having the main pole 102 and auxiliary pole 106, the insulator 104 and 110, the shield 108, and the coils 120 and 130, respectively. The pole 101' may be a PMR pole. Thus, the transducer 100' may be a PMR transducer. However, the pole 101' and transducer may be used in other writers. For example, the transducer 100' may be an EAMR transducer. Further, a read transducer may also be coupled with the write transducer 100'.

The coils 120' and 130' are conductive and carry a write current used to energize the pole. In some embodiments, the coils 120' and 130' may be separate, pancake coils. In other embodiments, the coils 120' and 130' form a single helical coil. The insulators 104' and 110' may include several different insulators and/or may be formed in multiple fabrication steps. The insulator 110' is nonmagnetic and insulates the turns 132', 134', 136' and 138' of the coil 130'. The insulator 104' and 110' may include aluminum oxide and may be formed using ALD. Thus, the spacing between the turns 132', 134', 136' and 138' may be small, for example on the order of 0.25 µm or less.

The coils 120' and 130' are analogous to the coils 120 and 130, respectively. The coil 120' includes turns 122', 124', 126' and 128' analogous to the turns 122, 124, 126 and 128, respectively. Similarly, the coil 130' includes turns 132', 134', 136' and 138' that are analogous to the turns 132, 134, 136 and 138. Thus, the turns 122', 124', 126', 128', 132', 134', 136' and 138' may have an analogous configuration and operation to the turns 122, 124, 126, 128. 132, 134, 136, and 138, respectively. Thus, the coil 130' has two layers at different distances, d1' and d2', from the pole 101'. One layer of the coil 130' includes turns 132', 134' and 136', while the other layer includes a turn 138'. Further, the turn 138' has a height in the down track direction that is less than the length in the stripe height direction. In addition, the turn 138' extends over more than one of the turns 132', 134' and 136' in the other layer. In some embodiments, the turn 138' extends at least halfway under the turns 132' and 136'. In some such embodiments, the turn 138' extends to the edges of the turns 132' and 134' further from the central turn 134'. In addition, the turns in different layers of the coil 130' may have different aspect ratios. In at least some embodiments, the cross-sectional area of the turn 138' has the substantially the same cross-sectional area as the turns 132', 134' and 136'. In the embodiment shown, both coils 120' and 130' have turns 128' and 138', respectively, that are longer than they are tall and extend over multiple turns in the other layer. However, in other embodiments, only one of the coils 120' or 130' has such a turn 128' or 138'. In such a case, the coil 130' is desired to have such a turn 138' because there may be less space in the region in which the coil 130' resides. However, in the embodiment shown, the position of the turn 138' with respect to the pole 101' is opposite to that of the turns 132', 134' and 136'. Thus, the turn 138' is closer to the pole 101' than the turns 132', 134' and 136'.

The magnetic transducer 100' may share the benefits of the magnetic transducer 100. The magnetic transducer 100' may have improved performance at high data rates. Because of the configuration of the coil 130', the coils 130' may occupy less space in the stripe height direction. For example, in some embodiments, the coil 130' extends not more than 4.5 µm in the stripe height direction. In some such embodiments, the coil 130' extends not more than 3 µm in the stripe height direction. As a result, the yoke may be shorter. For example, in some embodiments, the yoke length is not more than 4.5 µm. In some such embodiments, the yoke length is not more than 3 µm. The response time of the pole 101' may thus be improved.

Figure 4:
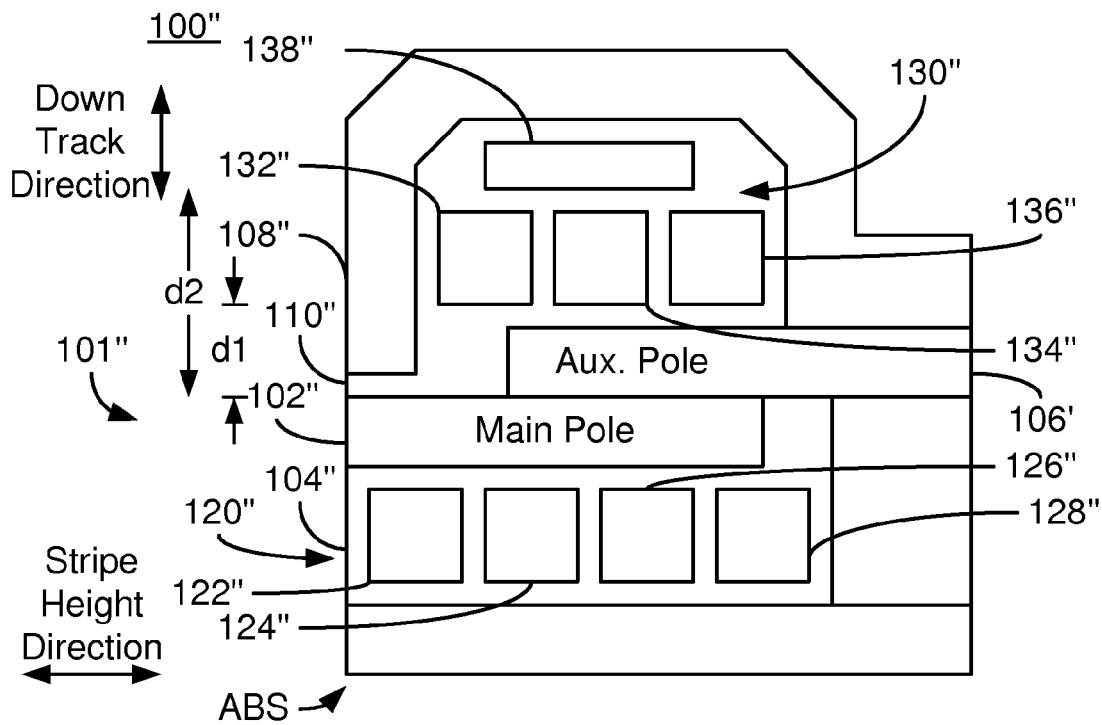
FIG. 4 depicts a side view of another exemplary embodiment of a write transducer.

FIG. 4 depicts a side view of an exemplary embodiment of a magnetic recording transducer 100". For simplicity, FIG. 4 is not to scale. The magnetic transducer 100" is analogous to the magnetic transducers 100 and 100'. Consequently, analogous components are labeled similarly. The magnetic write transducer 100" thus includes a write pole 101" having a main pole 102" and auxiliary pole 106", insulators 104" and 110", shield 108" and coils 120" and 130" that are analogous to the write pole 101/101' having the main pole 102/102' and auxiliary pole 106/106', the insulator 104/104' and 110/110', the shield 108/108', and the coils 120/120' and 130/130', respectively. The pole 101" may be a PMR pole. Thus, the transducer 100" may be a PMR transducer. However, the pole 101" and transducer may be used in other writers. For example, the transducer 100" may be an EAMR transducer. Further, a read transducer may also be coupled with the write transducer 100".

The coils 120" and 130" are conductive and carry a write current used to energize the pole. In some embodiments, the coils 120" and 130" may be separate, pancake coils. In other embodiments, the coils 120" and 130" form a single helical coil. The insulators 104" and 110" may include several different insulators and/or may be formed in multiple fabrication steps. The insulator 110" is nonmagnetic and insulates the turns 132", 134", 136" and 138" of the coil 130". The insulator 104" and 110" may include aluminum oxide and may be formed using ALD. Thus, the spacing between the turns 132", 134", 136" and 138" may be small, for example on the order of 0.25 µm or less.

The coils 120" and 130" are analogous to the coils 120/120' and 130/130', respectively. The coil 120" includes turns 122", 124", 126" and 128" analogous to the turns 122/122', 124/124', 126/126' and 128/128', respectively. Similarly, the coil 130' includes turns 132', 134', 136' and 138' that are analogous to the turns 132/132', 134/134', 136/136' and 138/138'. Thus, the turns 122', 124', 126', 128', 132', 134', 136' and 138' may have an analogous configuration and operation to the turns 122/122', 124/124', 126/126', 128/128', 132/132', 134/134', 136/136', and 138/138', respectively. Thus, the coil 130" has two layers at different distances, d1 and d2, from the pole 101". One layer of the coil 130" includes turns 132", 134" and 136", while the other layer includes a turn 138". Further, the turn 138" has a height in the down track direction that is less than the length in the stripe height direction. In addition, the turn 138" extends over more than one of the turns 132", 134" and 136" in the other layer. In some embodiments, the turn 138" extends at least halfway over the turns 132" and 136". In some such embodiments, the turn 138" extends to the edges of the turns 132" and 134" further from the central turn 134". In addition, the turns in different layers of the coil 130" may have different aspect ratios. In at least some embodiments, the cross-sectional area of the turn 138" has the substantially the same cross-sectional area as the turns 132", 134" and 136". In the embodiment shown, coil 130' has turn 138" that is wider than it is tall and extends over multiple turns in the other layer. However, in the embodiment shown, the coil 120" has all turns 122", 124", 126" and 128" in a single layer.

The magnetic transducer 100" may share the benefits of the magnetic transducer 100/100'. The magnetic transducer 100"' may have improved performance at high data rates. Because of the configuration of the coil 130", the coils 130" may occupy less space in the stripe height direction. For example, in some embodiments, the coil 130" extends not more than 4.5 µm in the stripe height direction. In some such embodiments, the coil 130" extends not more than 3 µm in the stripe height direction. As a result, the yoke may be shorter. For example, in some embodiments, the yoke length is not more than 4.5 µm. In some such embodiments, the yoke length is not more than 3 µm. The response time of the pole 101" may thus be improved.

Figure 5:
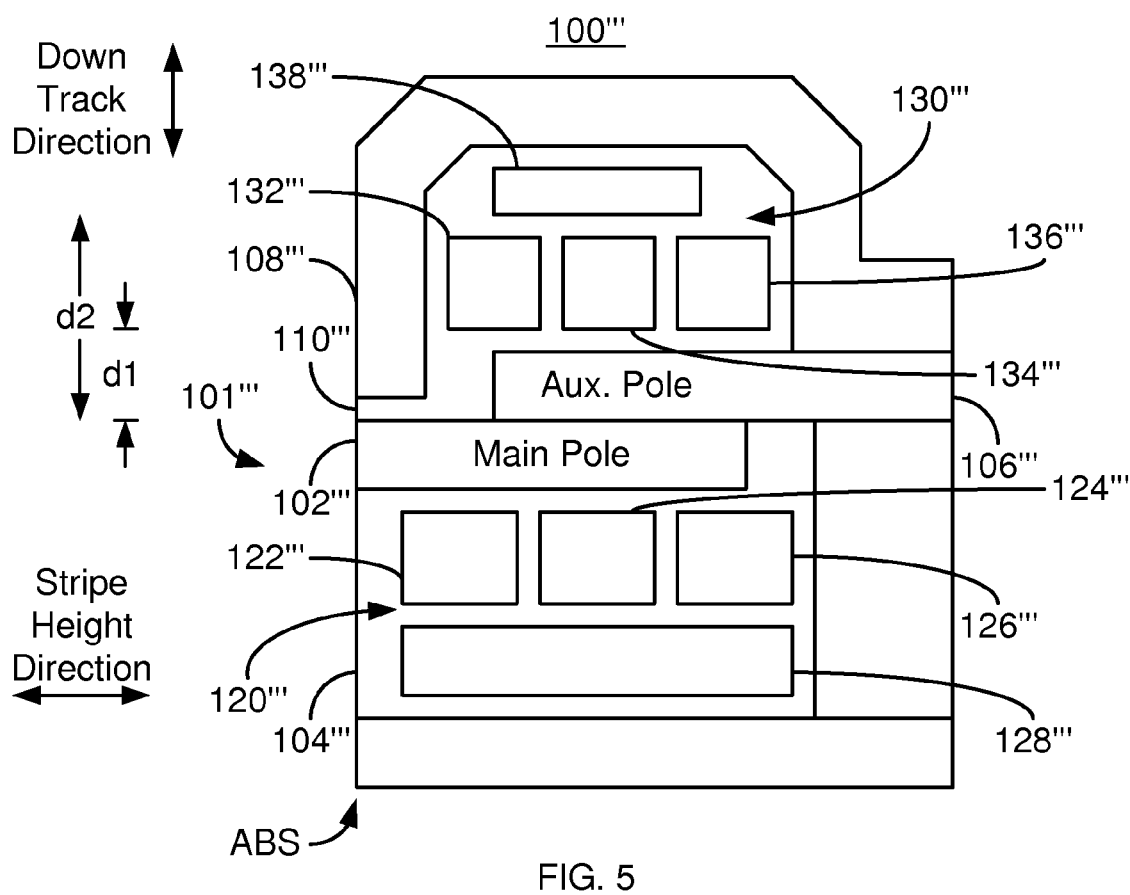
FIG. 5 depicts a side view of another exemplary embodiment of a write transducer.

FIG. 5 depicts a side view of an exemplary embodiment of a magnetic recording transducer 100'''. For simplicity, FIG. 5 is not to scale. The magnetic transducer 100''' is analogous to the magnetic transducers 100, 100' and 100". Consequently, analogous components are labeled similarly. The magnetic write transducer 100''' thus includes a write pole 101''' having a main pole 102''' and auxiliary pole 106''', insulators 104''' and 110''', shield 108''' and coils 120''' and 130''' that are analogous to the write pole 101/101'/101" having the main pole 102/102'/102" and auxiliary pole 106/106'/106", the insulator 104/104'/104" and 110/110'/110", the shield 108/108'/108", and the coils 120/120'/120" and 130/130'/130", respectively. The pole 101''' may be a PMR pole. Thus, the transducer 100''' may be a PMR transducer. However, the pole 101''' and transducer may be used in other writers. For example, the transducer 100''' may be an EAMR transducer. Further, a read transducer may also be coupled with the write transducer 100'''.

The coils 120''' and 130''' are conductive and carry a write current used to energize the pole. In some embodiments, the coils 120''' and 130''' may be separate, pancake coils. In other embodiments, the coils 120''' and 130''' form a single helical coil. The insulators 104''' and 110''' may include several different insulators and/or may be formed in multiple fabrication steps. The insulator 110''' is nonmagnetic and insulates the turns 132''', 134''', 136''' and 138''' of the coil 130". The insulator 104''' and 110''' may include aluminum oxide and may be formed using ALD. Thus, the spacing between the turns 132''', 134''', 136''' and 138''' may be small, for example on the order of 0.25 µm or less.

The coils 120''' and 130''' are analogous to the coils 120/120'/120" and 130/130'/130", respectively. The coil 120''' includes turns 122''', 124''', 126''' and 128''' analogous to the turns 122/122'/122", 124/124'/124", 126/126'/126" and 128/128'/128", respectively. Similarly, the coil 130''' includes turns 132''', 134''', 136''' and 138''' that are analogous to the turns 132/132'/132", 134/134'/134", 136/136'/136" and 138/138'/138". Thus, the turns 122''', 124''', 126''', 128''', 132''', 134''', 136''' and 138''' may have an analogous configuration and operation to the turns 122/122'/122", 124/124'/124", 126/126'/126", 128/128'/128", 132/132'/132", 134/134'/134", 136/136'/136" and 138/138'/138", respectively. Thus, the coil 130''' has two layers at different distances, d1 and d2, from the pole 101'''. One layer of the coil 130''' includes turns 132''', 134''' and 136''', while the other layer includes a turn 138'''. Further, the turn 138''' has a height in the down track direction that is less than the length in the stripe height direction. In addition, the turn 138''' extends over more than one of the turns 132''', 134''' and 136''' in the other layer. In some embodiments, the turn 138''' extends at least halfway over the turns 132''' and 136'''. In some such embodiments, the turn 138''' extends to the edges of the turns 132''' and 134''' further from the central turn 134'''. In addition, the turns in different layers of the coil 130''' may have different aspect ratios. In at least some embodiments, the cross-sectional area of the turn 138''' has the substantially the same cross-sectional area as the turns 132''', 134''' and 136'''. In the embodiment shown, both coils 120''' and 130''' have turns 128''' and 138''', respectively, that are wider than they are tall and extend over multiple turns in the other layer. However, in other embodiments, only one of the coils 120''' or 130''' has such a turn 128''' or 138'''. In such a case, the coil 130''' is desired to have such a turn 138''' because there may be less space in the region in which the coil 130''' resides. However, in the embodiment shown, the position of the turn 128''' with respect to the pole 101''' is opposite to that of the turns 122''', 124''' and 126'''. Thus, the turn 128''' is closer to the pole 101''' than the turns 122''', 124''' and 126'''.

The magnetic transducer 100''' may share the benefits of the magnetic transducers 100, 100', and 100''. The magnetic transducer 100''' may have improved performance at high data rates. Because of the configuration of the coil 130''', the coil 130''' may occupy less space in the stripe height direction. For example, in some embodiments, the coil 130''' extends not more than 4.5 µm in the stripe height direction. In some such embodiments, the coil 130''' extends not more than 3 µm in the stripe height direction. As a result, the yoke may be shorter. For example, in some embodiments, the yoke length is not more than 4.5 µm. In some such embodiments, the yoke length is not more than 3 µm. The response time of the pole 101''' may thus be improved.

Figure 6:
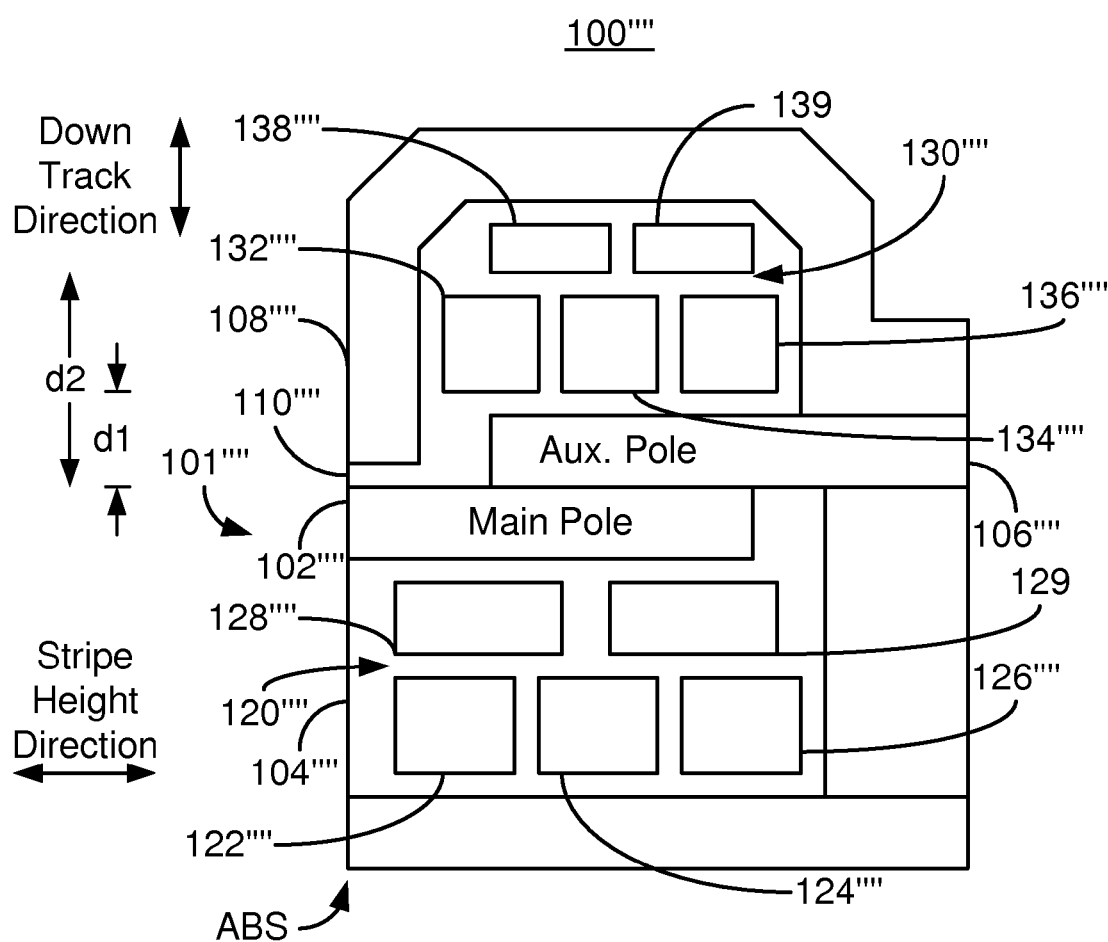
FIG. 6 depicts a side view of another exemplary embodiment of a write transducer

FIG. 6 depicts a side view of an exemplary embodiment of a magnetic recording transducer 100''''. For simplicity, FIG. 6 is not to scale. The magnetic transducer 100'''' is analogous to the magnetic transducers 100, 100', 100'' and 100'''. Consequently, analogous components are labeled similarly. The magnetic write transducer 100'''' thus includes a write pole 101'''' having a main pole 102'''' and auxiliary pole 106'''', insulators 104'''' and 110'''', shield 108'''' and coils 120'''' and 130'''' that are analogous to the write pole 101/101'/101''/101''' having the main pole 102/102'/102''/102''' and auxiliary pole 106/106'/106''/106''', the insulator 104/104'/104''/104''' and 110/110'/110''/110''', the shield 108/108'/108''/108''', and the coils 120/120'/120''/120''' and 130/130'/130''/130''', respectively. The pole 101'''' may be a PMR pole. Thus, the transducer 100'''' may be a PMR transducer. However, the pole 101'''' and transducer may be used in other writers. For example, the transducer 100'''' may be an EAMR transducer. Further, a read transducer may also be coupled with the write transducer 100''''.

The coils 120'''' and 130'''' are conductive and carry a write current used to energize the pole. In some embodiments, the coils 120'''' and 130'''' may be separate, pancake coils. In other embodiments, the coils 120'''' and 130'''' form a single helical coil. The insulators 104'''' and 110'''' may include several different insulators and/or may be formed in multiple fabrication steps. The insulator 110'''' is nonmagnetic and insulates the turns 132'''', 134'''', 136'''' and 138'''' of the coil 130''. The insulator 104'''' and 110'''' may include aluminum oxide and may be formed using ALD. Thus, the spacing between the turns 132'''', 134'''', 136'''' and 138'''' may be small, for example on the order of 0.25 µm or less.

The coils 120'''' and 130'''' are analogous to the coils 120/120'/120''/120''' and 130/130'/130''/130''', respectively. The coil 120'''' includes turns 122'''', 124'''', 126'''' and 128'''' analogous to the turns 122/122'/122''/122''', 124/124'/124''/124''', 126/126'/126''/126''' and 128/128'/128''/128''', respectively. Similarly, the coil 130'''' includes turns 132'''', 134'''', 136'''' and 138'''' that are analogous to the turns 132/132'/132''/132''', 134/134'/134''/134''', 136/136'/136''/136''' and 138/138'/138''/138'''. The turns 122'''', 124'''', 126'''', 128'''', 132'''', 134'''', 136'''' and 138'''' may have an analogous configuration and operation to the turns 122/122'/122''/122''', 124/124'/124''/124''', 126/126'/126''/126''', 128/128'/128''/128''', 132/132'/132''/132''', 134/134'/134''/134''', 136/136'/136''/136''' and 138/138'/138''/138''', respectively. Thus, the coil 130'''' has two layers at different distances, d1 and d2, from the pole 101''''. One layer of the coil 130'''' includes turns 132'''', 134'''' and 136'''', while the other layer includes turn 138''''. Further, the turn 138'''' has a height in the down track direction that is less than the length in the stripe height direction. In addition, the turn 138'''' extends over more than one of the turns 132'''', 134'''' and 136'''' in the other layer. In some embodiments, the turn 138'''' extends at least halfway over the turns 132'''' and 136''''. In some such embodiments, the turn 138'''' extends to the edges of the turn 132'''' further from the central turn 134''''. In addition, the turns in different layers of the coil 130'''' may have different aspect ratios. In at least some embodiments, the cross-sectional area of the turn 138'''' has the substantially the same cross-sectional area as the turns 132'''', 134'''' and 136''''. In the embodiment shown, both coils 120'''' and 130'''' have turns 128'''' and 138'''', respectively, that are wider than they are tall and extend over multiple turns in the other layer. However, in other embodiments, only one of the coils 120'''' or 130'''' has such a turn 128'''' or 138''''. In such a case, the coil 130'''' is desired to have such a turn 138'''' because there may be less space in the region in which the coil 130'''' resides. Further, the layer including turn 138'''' also include an additional turn 139. The turn 139 has an aspect ratio similar to that of the turn 138'''' and may be substantially identical to the turn 138''''. The coil 120'''' also has a turn 129 that corresponds to the turn 139.

The magnetic transducer 100'''' may share the benefits of the magnetic transducers 100, 100', 100'' and 100'''. The magnetic transducer 100'''' may have improved performance at high data rates. Because of the configuration of the coil 130'''', the coil 130'''' may occupy less space in the stripe height direction. For example, in some embodiments, the coil 130'''' extends not more than 4.5 µm in the stripe height direction. In some such embodiments, the coil 130'''' extends not more than 3 µm in the stripe height direction. As a result, the yoke may be shorter. For example, in some embodiments, the yoke length is not more than 4.5 µm. In some such embodiments, the yoke length is not more than 3 µm. The response time of the pole 101'''' may thus be improved.

Figure 7:
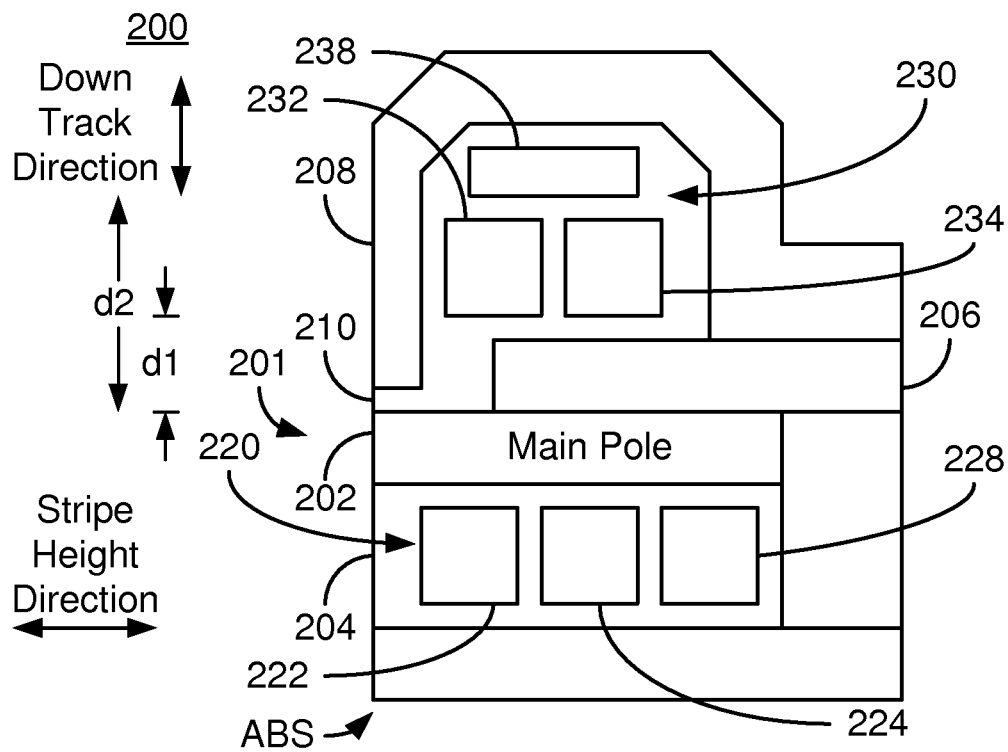
FIG. 7 depicts a side view of another exemplary embodiment of a write transducer

FIG. 7 depicts a side view of an exemplary embodiment of a magnetic recording transducer 200. For simplicity, FIG. 7 is not to scale. The magnetic transducer 200 is analogous to the magnetic transducers 100, 100', 100'', 100''' and/or 100''''. Consequently, analogous components are labeled similarly. The magnetic write transducer 200 thus includes a write pole 201 having a main pole 202 and auxiliary pole 206, insulators 204 and 210, shield 208 and coils 220 and 230 that are analogous to the write pole 101/101'/101''/101'''/101'''' having the main pole 102/102'/102''/102'''/102'''' and auxiliary pole 106/106'/106''/106'''/106'''', the insulator 104/104'/104''/104'''/104'''' and 110/110'/110''/110'''/110'''', the shield 108/108'/108''/108'''/108'''', and the coils 120/120'/120''/120'''/120'''' and 130/130'/130''/130'''/130'''', respectively. The pole 201 may be a PMR pole. Thus, the transducer 200 may be a PMR transducer. However, the pole 201 and transducer may be used in other writers. For example, the transducer 200 may be an EAMR transducer. Further, a read transducer may also be coupled with the write transducer 200.

The coils 220 and 230 are conductive and carry a write current used to energize the pole. In some embodiments, the coils 220 and 230 may be separate, pancake coils. In other embodiments, the coils 220 and 230 form a single helical coil. The insulators 204 and 210 may include several different insulators and/or may be formed in multiple fabrication steps. The insulator 210 is nonmagnetic and insulates the turns 232, 234 and 238 of the coil 230. The insulator 204 and 210 may include aluminum oxide and may be formed using ALD. Thus, the spacing between the turns 232, 234, and 238 may be small, for example on the order of 0.25 µm or less.

The coils 220 and 230 are analogous to the coils shown in FIGS. 2-6, respectively. However, the coils 220 and 230 include a total of three turns each. The coil 220 includes turns 222, 224 and 228 analogous to the turns 122/122'/122"/122"'/122"", 124/124'/124"/124"'/124"", and 128/128'/128"/128"'/128"", respectively. Similarly, the coil 230 includes turns 232, 234 and 238 that are analogous to the turns 132/132'/132"/132"'/132"", 134/134'/134"/134"'/134"" and 138/138'/138"/138"'/138"". The turns 222, 224, 228, 232, 234 and 238 may have an analogous configuration and operation to the turns 122/122'/122"/122"'/122"", 124/124'/124"/124"'/124"", 128/128'/128"/128"'/128"", 132/132'/132"/132"'/132"", 134/134'/134"/134"'/134"" and 138/138'/138"/138"'/138"". Thus, the coil 230 has two layers at different distances, d1 and d2, from the pole 201. One layer of the coil 230 includes turns 232 and 234, while the other layer includes turn 238. Further, the turn 238 has a height in the down track direction that is less than the length in the stripe height direction. In addition, the turn 238 extends over both of the turns 232 and 234 in the other layer. In some embodiments, the turn 238 extends at least halfway over the turns 232 and 234. In some such embodiments, the turn 238 extends to the edges of the turns 232 and 234. In addition, the turns in different layers of the coil 230 may have different aspect ratios. In at least some embodiments, the cross-sectional area of the turn 238 has the substantially the same cross-sectional area as the turns 232 and 234. In the embodiment shown, the coil 220 has all turns 222, 224 and 228 in the same layer.

The magnetic transducer 200 may share the benefits of the magnetic transducers 100, 100', 100", 100"' and 100"". The magnetic transducer 200 may have improved performance at high data rates. Because of the configuration of the coil 230, the coil 230 may occupy less space in the stripe height direction. For example, in some embodiments, the coil 230 extends not more than 4.5 µm in the stripe height direction. In some such embodiments, the coil 230 extends not more than 3 µm in the stripe height direction. Further, because there are only two turns 232 and 234 in the layer of the coil 230, the length over which the turns 232 and 234 extend in the stripe height direction may be even further reduced. As a result, the yoke may be shorter. For example, in some embodiments, the yoke length is not more than 4.5 µm. In some such embodiments, the yoke length is not more than 3 µm. The response time of the pole 201 may thus be improved.

Figure 8:
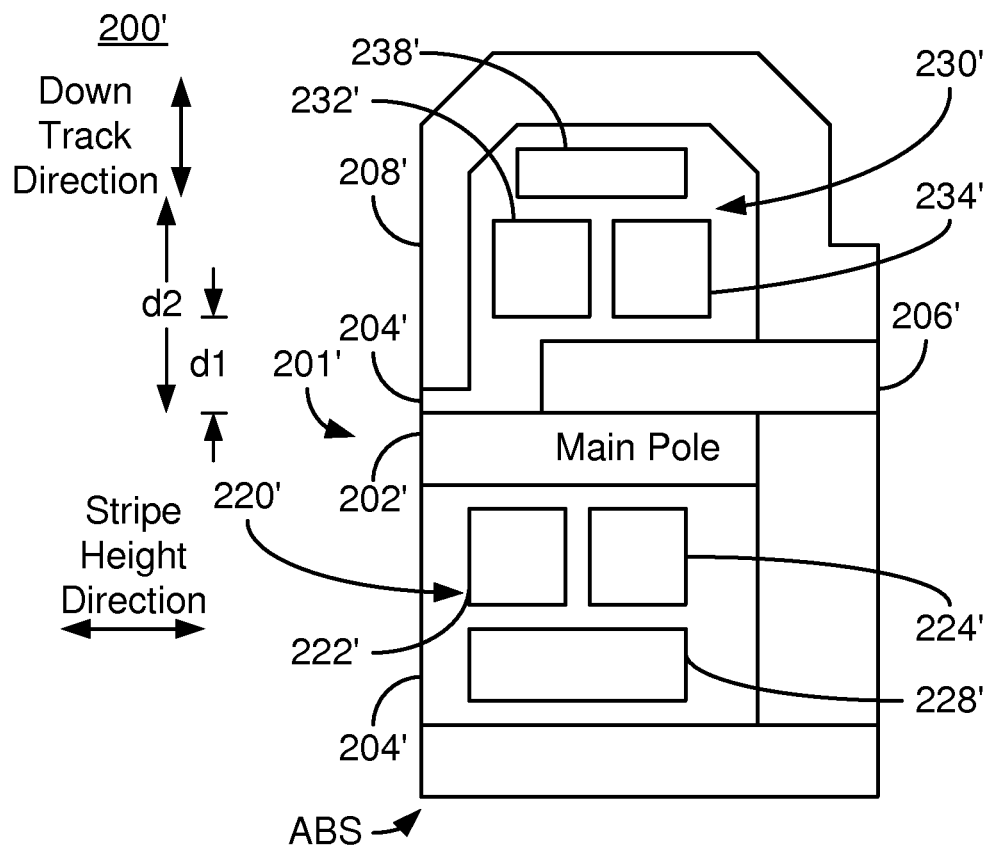
FIG. 8 depicts a side view of another exemplary embodiment of a write transducer

FIG. 8 depicts a side view of an exemplary embodiment of a magnetic recording transducer 200'. For simplicity, FIG. 8 is not to scale. The magnetic transducer 200' is analogous to the magnetic transducer 200 and thus to the transducers 100, 100', 100", 100"' and/or 100"". Consequently, analogous components are labeled similarly. The magnetic write transducer 200' thus includes a write pole 201' having a main pole 202' and auxiliary pole 206', insulators 204' and 210', shield 208' and coils 220' and 230' that are analogous to the write pole 201 having the main pole 202 and auxiliary pole 206, insulators 204 and 210, shield 208 and coils 220 and 230. The pole 201' may be a PMR pole. Thus, the transducer 200' may be a PMR transducer. However, the pole 201' and transducer may be used in other writers. For example, the transducer 200' may be an EAMR transducer. Further, a read transducer may also be coupled with the write transducer 200'.

The coils 220' and 230' are conductive and carry a write current used to energize the pole. In some embodiments, the coils 220' and 230' may be separate, pancake coils. In other embodiments, the coils 220' and 230' form a single helical coil. The insulators 204' and 210' may include several different insulators and/or may be formed in multiple fabrication steps. The insulator 210' is nonmagnetic and insulates the turns 232', 234' and 238' of the coil 230'. The insulator 204' and 210' may include aluminum oxide and may be formed using ALD. Thus, the spacing between the turns 232', 234', and 238' may be small, for example on the order of 0.25 µm or less.

The coils 220' and 230' are analogous to the coils shown in FIGS. 2-7, respectively. However, the coils 220' and 230' include a total of three turns each. The coil 220' includes turns 222', 224' and 228' analogous to the turns 122/122'/122"/122"'/122""/222, 124/124'/124"/124"'/124""/224, and 128/128'/128"/128"'/128""/228, respectively. Similarly, the coil 230' includes turns 232', 234' and 238' that are analogous to the turns 132/132'/132"/132"'/132""/232, 134/134'/134"/134"'/134""/234 and 138/138'/138"/138"'/138""/238. The turns 222', 224', 228', 232', 234' and 238' may have an analogous configuration and operation to the turns 222, 224, 228, 232, 234 and 238. Thus, the coil 230' has two layers at different distances, d1 and d2, from the pole 201'. One layer of the coil 230' includes turns 232' and 234', while the other layer includes turn 238'. Further, the turn 238' has a height in the down track direction that is less than the length in the stripe height direction. In addition, the turn 238' extends over both of the turns 232' and 234' in the other layer. In some embodiments, the turn 238' extends at least halfway over the turns 232' and 234'. In some such embodiments, the turn 238' extends to the edges of the turns 232' and 234'. In addition, the turns in different layers of the coil 230' may have different aspect ratios. In at least some embodiments, the cross-sectional area of the turn 238' has the substantially the same cross-sectional area as the turns 232' and 234'. However, in the embodiment shown, both coils 220' and 230' have turns 228' and 238', respectively, that are wider than they are tall and extend across multiple turns in the other layer The magnetic transducer 200' may share the benefits of the magnetic transducers 100, 100', 100", 100"', 100"", and/or 200. The magnetic transducer 200' may have improved performance at high data rates. Because of the configuration of the coil 230', the coil 230' may occupy less space in the stripe height direction. For example, in some embodiments, the coil 230' extends not more than 4.5 µm in the stripe height direction. In some such embodiments, the coil 230' extends not more than 3 µm in the stripe height direction. Further, because there are only two turns 232' and 234' in the layer of the coil 230', the length over which the turns 232' and 234' extend in the stripe height direction may be even further reduced. As a result, the yoke may be shorter. In some embodiments, For example, in some embodiments, the yoke length is not more than 4.5 µm. In some such embodiments, the yoke length is not more than 3 µm. The response time of the pole 201' may thus be improved.

Figure 9:
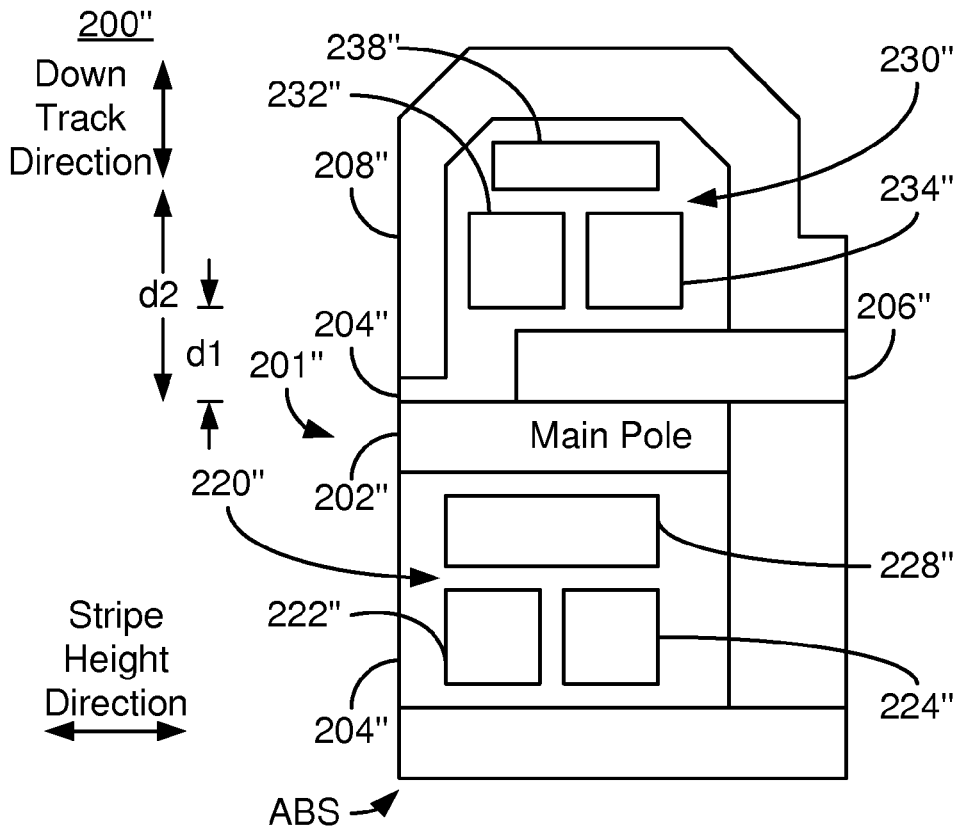

FIG. 9 depicts a side view of an exemplary embodiment of a magnetic recording transducer 200". For simplicity, FIG. 9 is not to scale. The magnetic transducer 200" is analogous to the magnetic transducers 200, 200' and thus to the transducers 100, 100', 100", 100"' and/or 100"". Consequently, analogous components are labeled similarly. The magnetic write transducer 200" thus includes a write pole 201" having a main pole 202" and auxiliary pole 206", insulators 204" and 210", shield 208" and coils 220" and 230" that are analogous to the write pole 201/201' having the main pole 202/202' and auxiliary pole 206/206', insulators 204/204' and 210/210', shield 208/208' and coils 220/220' and 230/230'. The pole 201" may be a PMR pole. Thus, the transducer 200" may be a PMR transducer. However, the pole 201" and transducer may be used in other writers. For example, the transducer 200" may be an EAMR transducer. Further, a read transducer may also be coupled with the write transducer 200".

The coils 220" and 230" are conductive and carry a write current used to energize the pole. In some embodiments, the coils 220" and 230" may be separate, pancake coils. In other embodiments, the coils 220" and 230" form a single helical coil. The insulators 204" and 210" may include several different insulators and/or may be formed in multiple fabrication steps. The insulator 210" is nonmagnetic and insulates the turns 232", 234" and 238" of the coil 230". The insulator 204" and 210" may include aluminum oxide and may be formed using ALD. Thus, the spacing between the turns 232", 234", and 238" may be small, for example on the order of 0.25 μm or less.

The coils 220" and 230" are analogous to the coils shown in FIGS. 2-8, respectively. However, the coils 220" and 230" include a total of three turns each. The coil 220" includes turns 222", 224" and 228" analogous to the turns 122/122'/122"/122"'/122""/222/222', 124/124'/124"/124"'/124""/224/224', and 128/128'/128"/128"'/128""/228/228', respectively. Similarly, the coil 230" includes turns 232", 234" and 238" that are analogous to the turns 132/132'/132"/132"'/132""/232/232", 134/134'/134"/134"'/134""/234/234' and 138/138'/138"/138"'/138""/238/238'. The turns 222", 224", 228", 232", 234" and 238" may have an analogous configuration and operation to the turns 222/222', 224/224', 228/228', 232/232', 234/234' and 238/238'. Thus, the coil 230" has two layers at different distances, d1 and d2, from the pole 201". One layer of the coil 230" includes turns 232" and 234", while the other layer includes turn 238". Further, the turn 238" has a height in the down track direction that is less than the length in the stripe height direction. In addition, the turn 238" extends over both of the turns 232" and 234" in the other layer. In some embodiments, the turn 238" extends at least halfway over the turns 232" and 234". In some such embodiments, the turn 238" extends to the edges of the turns 232" and 234". In addition, the turns in different layers of the coil 230" may have different aspect ratios. In at least some embodiments, the cross-sectional area of the turn 238" has the substantially the same cross-sectional area as the turns 232" and 234". In the embodiment shown, both coils 220" and 230" have turns 228" and 238", respectively, that are wider than they are tall and extend across multiple turns in the other layer. In addition, the turn 238" is closer to the pole 201" than the turns 232" and 234".

The magnetic transducer 200" may share the benefits of the magnetic transducers 100, 100', 100", 100"', 100"", 200 and/or 200'. The magnetic transducer 200" may have improved performance at high data rates. Because of the configuration of the coil 230", the coil 230" may occupy less space in the stripe height direction. For example, in some embodiments, the coil 230" extends not more than 4.5 μm in the stripe height direction. In some such embodiments, the coil 230" extends not more than 3 μm in the stripe height direction. Further, because there are only two turns 232" and 234" in the layer of the coil 230", the length over which the turns 232" and 234" extend in the stripe height direction may be even further reduced. As a result, the yoke may be shorter. In some embodiments, For example, in some embodiments, the yoke length is not more than 4.5 μm. In some such embodiments, the yoke length is not more than 3 μm. The response time of the pole 201" may thus be improved. Further, although disclosed separately, note that one or more of the features of the transducers 100, 100', 100", 100"', 100"", 200, 200', and/or 200" may be combined.

Figure 10:
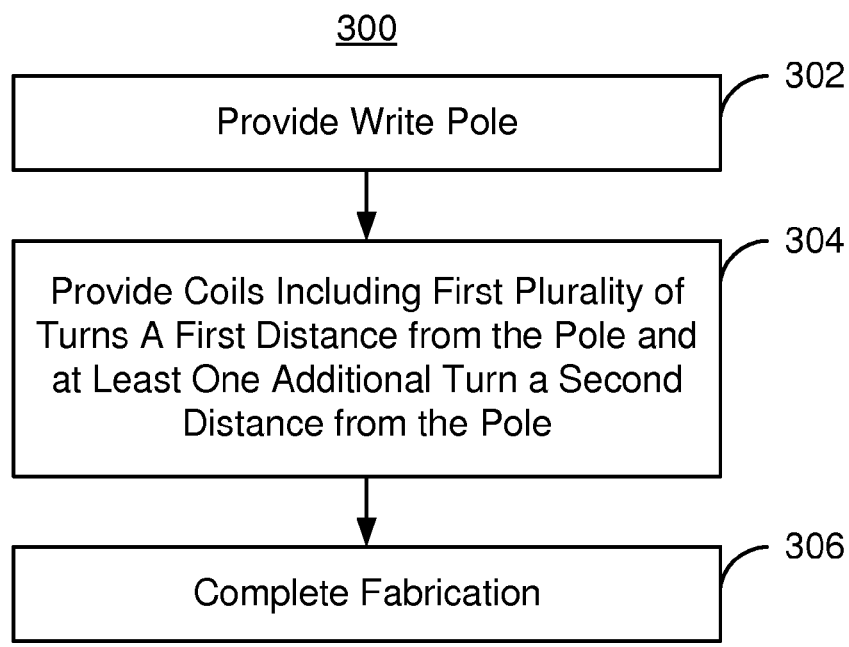
FIG. 10 is a flow chart depicting an exemplary embodiment of a method for providing a write transducer.

FIG. 10 depicts an exemplary embodiment of a method 300 for fabricating a magnetic transducer analogous to the transducers 100, 100', 100", 100"', 100"", 200, 200' and/or 200". The method 300 is described in connection with the transducer 100. However, the method 300 may be used to fabricate any of the transducers 100, 100', 100", 100"', 100"", 200, 200' and/or 200" as well as other analogous transducers. Although depicted as a flow of single steps, the steps of the method 300 may be performed in parallel. The steps of the method 300 may include substeps, may be performed in another order and/or may be interleaved.

The write pole 101 is provided, via step 302. The coils 120 and/or 130 are also fabricated, via step 304. Step 304 may include various patterning and deposition steps to form the coils 120 and 130. Further, the steps 302 and 304 are typically interleaved. For example, the coil 120 is provided before the main pole 102 and auxiliary pole 106. In contrast, the coil 130 is provided after the main pole, but before lapping of the transducer 100. Step 304 includes providing the turns 132, 134, 136 and 138 of at least the coil 130 in multiple layers. Step 204 may also include forming the turn(s) such as turn 138 in one layer such that the turn(s) have a height that is smaller than their length. In addition the turns 132, 134, 136 and 138 are insulated in step 304. This may include using ALD to deposit aluminum oxide that covers the turns 132, 134 and 136 and insulates the turns 132, 134, and 136 from each other and from the turn 138. Thus, the coil 130, 130', 130", 130"', 130"", 230, 230' and 230"' may be formed. Similarly, the coil 120, 120', 120", 120"', 120"", 220, 220' and 220" may be fabricated in step 304. Fabrication of the magnetic transducer may then be completed, via step 306. For example, the shield 108 may be formed. In addition, other structure(s) may be formed and the transducer 100 may be lapped to the ABS. Thus, the magnetic recording transducer 100 may be formed. Similarly, the transducers 100', 100", 100"', 100"", 200, 200' and 200" may be formed. Thus, the benefits of one or more of the transducer 100', 100", 100"', 100"", 200, 200' and/or 200" may be attained.

We claim:

1. A magnetic transducer having air-bearing surface (ABS) comprising:
   a write pole having a pole tip and a yoke;
   at least one coil for energizing the write pole, the at least one coil including a plurality of turns a first distance from the pole and at least one additional turn a second distance from the pole, a portion of the at least one additional turn extending over at least part of two of the plurality of turns and having a length in a stripe height direction perpendicular to the ABS and a height in a down track direction, the length being greater than the height, the first distance being different from the second distance; and
   a shield, the portion of the at least one turn and the part of the two of the plurality of turns being between the shield and the write pole.

2. The magnetic transducer of claim 1 wherein the at least one additional turn is a single turn and wherein the single turn covers at least a portion of each of the plurality of turns.

3. The magnetic transducer of claim 2 wherein the at least one coil is a helical coil.

4. The magnetic transducer of claim 2 wherein the at least one coil is a pancake coils.

5. The magnetic transducer of claim 1 wherein each of the plurality of turns has a first cross-sectional area, each of the at least one turn has a second cross-sectional area, the first cross-sectional area being substantially equal to the second cross-sectional area.

6. The magnetic transducer of claim 1 wherein the plurality of turns includes a central turn and wherein the at least one turn is centered in on the central turn.

7. The magnetic transducer of claim 1 wherein the plurality of turns includes two turns.

8. The magnetic transducer of claim 1 wherein the plurality of turns includes three turns.

9. The magnetic transducer of claim 1 wherein the first distance is less than the second distance.

10. The magnetic transducer of claim 1 wherein the first distance is greater than the second distance.

11. The magnetic transducer of claim 1 wherein the yoke has a yoke length of not more than 4.5 microns.

12. The magnetic transducer of claim 11 wherein the yoke length is not more than three microns.

13. The magnetic transducer of claim 1 further comprising:
a shield, the at least one coil residing between a portion of the shield and the write pole.

14. The magnetic transducer of claim 1 wherein the write pole is a perpendicular magnetic recording pole.

15. The magnetic transducer of claim 1 wherein the magnetic transducer is an energy assisted magnetic recording transducer.

16. A disk drive comprising:
a media,
a slider, and
a magnetic transducer coupled with the slider, the magnetic transducer having air-bearing surface (ABS), a write pole, at least one coil for energizing the write pole, and shield, the write pole having a pole tip and a yoke, the at least one coil including a first plurality of turns a first distance from the pole and at least one additional turn a second distance from the pole, a portion of the at least one additional turn extending over at least part of two of the plurality of turns and having a length in a stripe height direction perpendicular to the ABS and a height in a down track direction, the length being greater than the height, the first distance being different from the second distance, the portion of the at least one turn and the part of the two of the plurality of turns being between the shield and the write pole.

17. A method for fabricating magnetic transducer having air-bearing surface (ABS) comprising:
providing a write pole having a pole tip and a yoke;
providing at least one coil for energizing the write pole, the at least one coil including a first plurality of turns a first distance from the pole and at least one additional turn a second distance from the pole, a portion of the at least one additional turn extending over at least part of two of the plurality of turns and having a length in a stripe height direction perpendicular to the ABS and a height in a down track direction, the length being greater than the height, the first distance being different from the second distance; and
providing a shield, the portion of the at least one turn and the part of the two of the plurality of turns being between the shield and the write pole.

18. The method of claim 17 wherein the at least one additional turn is a single turn and wherein the single turn covers at least a portion of each of the plurality of turns.

19. The method of claim 18 wherein the at least one coil is a helical coil.

20. The method of claim 18 wherein the at least one coil is a pancake coils.

21. The method of claim 17 wherein each of the plurality of turns has a first cross-sectional area, each of the at least one turn has a second cross-sectional area, the first cross-sectional area being substantially equal to the second cross-sectional area.

22. The method of claim 17 wherein the plurality of turns includes a central turn and wherein the at least one turn is centered in on the central turn.

23. The method of claim 17 wherein the plurality of turns includes two turns.

24. The method of claim 17 wherein the plurality of turns includes three turns.

25. The method of claim 17 wherein the first distance is less than the second distance.

26. The method of claim 17 wherein the first distance is greater than the second distance.

* * * * *